United States Patent
Chang et al.

(10) Patent No.: US 9,143,171 B1
(45) Date of Patent: Sep. 22, 2015

(54) DUOBINARY VOLTAGE-MODE TRANSMITTER

(71) Applicants: NCKU Research and Development Foundation, Tainan (TW); Himax Technologies Limited, Tainan (TW)

(72) Inventors: Soon-Jyh Chang, Tainan (TW); Jih-Ren Goh, Tainan (TW); Chung-Ming Huang, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 0 days.

(21) Appl. No.: 14/330,960

(22) Filed: Jul. 14, 2014

(51) Int. Cl.
*H04L 25/34* (2006.01)
*H04L 25/49* (2006.01)
*H04B 1/04* (2006.01)
*H04L 12/12* (2006.01)

(52) U.S. Cl.
CPC . *H04B 1/04* (2013.01); *H04L 12/12* (2013.01)

(58) Field of Classification Search
CPC ........ H04B 1/04; H04L 12/12; H04L 25/497; H04L 25/4919; H04L 25/4917; H04L 25/4909
USPC ........... 375/295, 259, 286, 288, 291; 341/56, 341/68, 70
See application file for complete search history.

(56) References Cited

U.S. PATENT DOCUMENTS

| | | | | |
|---|---|---|---|---|
| 4,083,005 A | * | 4/1978 | Looschen | 375/288 |
| 4,618,941 A | * | 10/1986 | Linder et al. | 708/319 |
| 5,917,340 A | * | 6/1999 | Manohar et al. | 326/82 |
| 6,031,472 A | * | 2/2000 | Johnson et al. | 341/58 |
| 2005/0286642 A1 | * | 12/2005 | Kim | 375/242 |
| 2008/0291063 A1 | * | 11/2008 | Hollis | 341/55 |

* cited by examiner

*Primary Examiner* — Phuong Phu
(74) *Attorney, Agent, or Firm* — Donald E. Stout; Stout, Uxa & Buyan, LLP

(57) ABSTRACT

A duobinary voltage-mode transmitter comprises a first branch including a first logic circuit and a first driver, and a second branch including a second logic circuit and a second driver. When a transition occurs between NRZ signals, two ends of a first match circuit are electrically coupled between the output nodes of the first driver and the second driver, respectively, and the first driver and the second driver are turned off.

17 Claims, 11 Drawing Sheets

200

212

212

DUOBINARY VOLTAGE-MODE TRANSMITTER

BACKGROUND OF THE INVENTION

1. Field of the Invention

The present invention generally relates to a communication system, and more particularly to a duobinary voltage-mode (VM) transmitter.

2. Description of Related Art

FIG. 1 shows a block diagram of a wireline communication system 100 for transmitting and receiving data. Data are converted to a serial data stream by a serializer (SER) 11 to facilitate transmission over a single or a pair of differential lines. Transmit equalization is performed by a finite-impulse-response (FIR) filter 12, followed by a driver 13. Data are transmitted over a channel 14 such as a single or a pair of differential lines, and is received and processed by an equalizer (EQ) 15 to reduce intersymbol interference (ISI). The received data stream is then processed by a clock and data recovery (CDR) 16, followed by a deserializer (DES) 17 which converts the data stream into a parallel data format.

Power consumption and impedance match are two of crucial issues in designing a transmitter of a wireline communication system 100. "Digital Link Pre-emphasis with Dynamic Driver Impedance Modulation," entitled to Ranko Sredojevic et al., IEEE ISSCC 2010, the disclosure of which is incorporated herein by reference, discloses a digital push-pull impedance-modulating (RM) pre-emphasis driver to overcome the power overhead of equalization in voltage-mode (VM) drivers, improving the output stage efficiency. In the disclosure, differential path with impedance is shorted when data pattern is "11111 . . . " or "00000 . . . " There is no short circuit current, and consumed power is almost the same. However, there is still some room to improve regarding power consumption.

"Fully Digital Transmit Equalizer With Dynamic Impedance Modulation," entitled to Ranko Sredojevic et al., IEEE JSSC 2011, the disclosure of which is incorporated herein by reference, discloses a digital push-pull impedance-modulating (RM) driver. In the disclosure, impedance is increased to reduce the power consumption when data pattern is "11111 . . . " or "00000 . . . " According to the disclosure, voltage-mode (VM) power is different for different output voltage, however, with bad impedance match.

For the reason that conventional transmitters could not effectively reduce power consumption and improve impedance match, a need has arisen to propose a novel transmitter to overcome disadvantages of the conventional transmitters.

SUMMARY OF THE INVENTION

In view of the foregoing, it is an object of the embodiment of the present invention to provide a duobinary voltage-mode (VM) transmitter in which a driver may be turned off to substantially reduce average power consumption with an improved impedance match when a duobinary signal thereof has an intermediate level.

According to one embodiment, a duobinary voltage-mode transmitter includes a first branch, a second branch and a first match circuit. The first branch includes a first logic circuit and a first driver. The first logic circuit is coupled to receive non-return-to-zero (NRZ) signals, and configured to detect transition between the NRZ signals. The first driver is controlled by at least one output of the first logic circuit, thereby generating a duobinary signal. The second branch includes a second logic circuit and a second driver. The second logic circuit is coupled to receive complementary NRZ signals being complement to the NRZ signals received by the first logic circuit, and configured to detect transition between the complementary NRZ signals. The second driver is controlled by at least one output of the second logic circuit. The first match circuit has two ends coupled between output nodes of the first driver and the second driver, respectively, the first match circuit being switchable by an output of the first or second logic circuit. When a transition occurs between the NRZ signals, the first match circuit is switched on such that the two ends of the first match circuit are electrically coupled between the output nodes of the first driver and the second driver, respectively, and the first driver and the second driver are turned off.

DETAILED DESCRIPTION OF THE INVENTION

Figure 1:
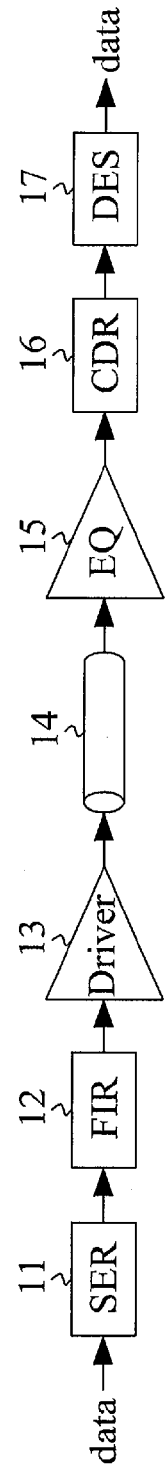
FIG. 1 shows a block diagram of a wireline communication system for transmitting and receiving data.
Figure 2:
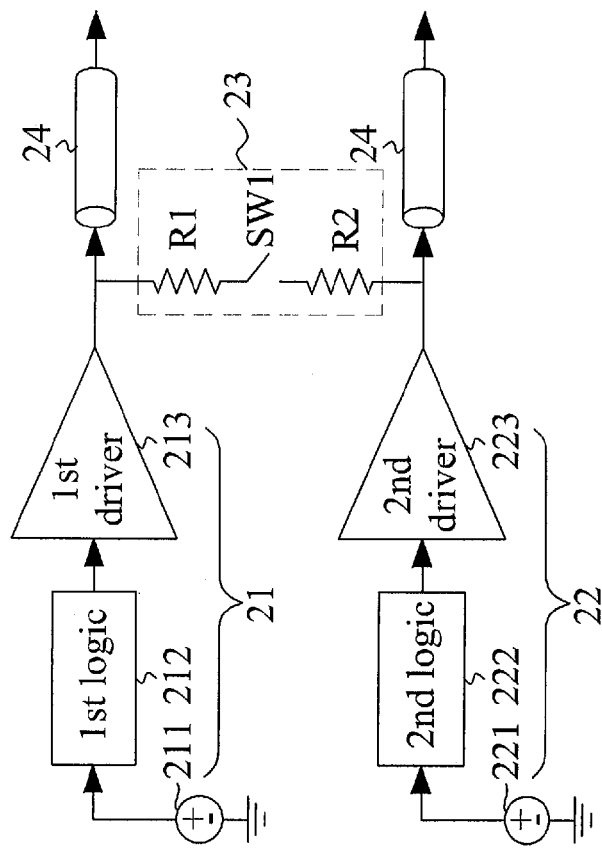
FIG. 2 shows a block diagram illustrated of a duobinary voltage-mode (VM) transmitter according to one embodiment of the present invention.

FIG. 2 shows a block diagram illustrated of a duobinary voltage-mode (VM) transmitter (transmitter hereinafter) 200 according to one embodiment of the present invention. The transmitter 200 of the embodiment includes two branches—a first branch 21 and a second branch 22. In the first branch 21, a first non-return-to-zero (NRZ) generator 211 generates a NRZ signal conforming to a 2-level NRZ code format, that is, a binary code in which, for example, "1" is represented by a positive voltage and "0" is represented by a negative voltage (or ground), with no other neutral or rest condition. Similarly, in the second branch 22, a second NRZ generator 221 generates a NRZ signal (conforming to the 2-level NRZ code format) that is complement to the generated NRZ signal from the first NRZ generator 211.

The first branch 21 includes a first logic circuit 212 coupled to receive the NRZ signals generated from the first NRZ generator 211, and configured to detect transition between the NRZ signals, resulting in outputs for controlling the following circuitry. The NRZ signals received by the first logic circuit 212 may include a present NRZ signal and at least one preceding (or delayed) NRZ signal. Similarly, the second branch 22 includes a second logic circuit 222 coupled to receive the NRZ signals generated from the second NRZ generator 221, and configured to detect transition between the NRZ signals, resulting in outputs for controlling the following circuitry. The NRZ signals received by the second logic circuit 222 may include a present NRZ signal and at least one preceding NRZ signal.

Figure 3:
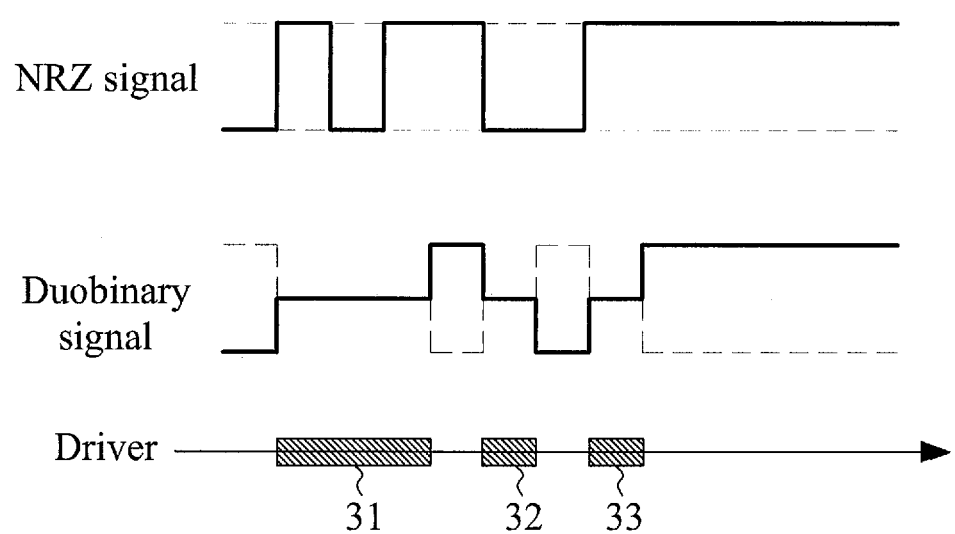
FIG. 3 shows an exemplary timing diagram illustrated of NRZ signals and associated duobinary signals.

As shown in FIG. 2, the first branch 21 may further include a first driver (also called main tap) 213 that receives the NRZ signal and operates under control of the outputs of the first logic circuit 212, thereby generating a duobinary ("duo" for short) signal that has 3 possible levels—"0", "1" and "2". For example, "2" is represented by a positive voltage, "0" is represented by a negative voltage (or ground), and "1" is represented by an in-between voltage. Specifically speaking, in case of a transition between the NRZ signals, for example, from "1" to "0" or from "0" to "1", the first driver 213 generates a duobinary signal "1"; otherwise, the first driver 213 generates a duobinary signal "2" when the NRZ signal is "1" or generates a duobinary signal "0" when the NRZ signal is "0". FIG. 3 shows an exemplary timing diagram illustrated of the NRZ signals and associated duobinary signals. Details of data format of the duobinary signal may be referred to "Design and Comparison of Three 20-Gb/s Backplane Transceivers for Duobinary, PAM4, and NRZ Data," entitled to Jri Lee et al., IEEE JSSC 2008, the disclosure of which is incorporated herein by reference. Similarly, the second branch 22 may further include a second driver (also called main tap) 223 that receives the NRZ signal and operates under control of the outputs of the second logic circuit 222, thereby generating a duobinary signal.

A first match circuit 23 having two ends electrically coupled between output nodes of the first and second drivers 213 and 223, respectively. The first match circuit 23 may be schematically represented by a first match resistor R1, a second match resistor R2 and a first switch SW1 connected in series. When the first switch SW1 is closed, the first resistor R1 and the second resistor R2 collectively have a resistance being substantially approximate to an impedance of a transmission channel 24 such that a proper impedance match may be achieved.

Figure 4A:
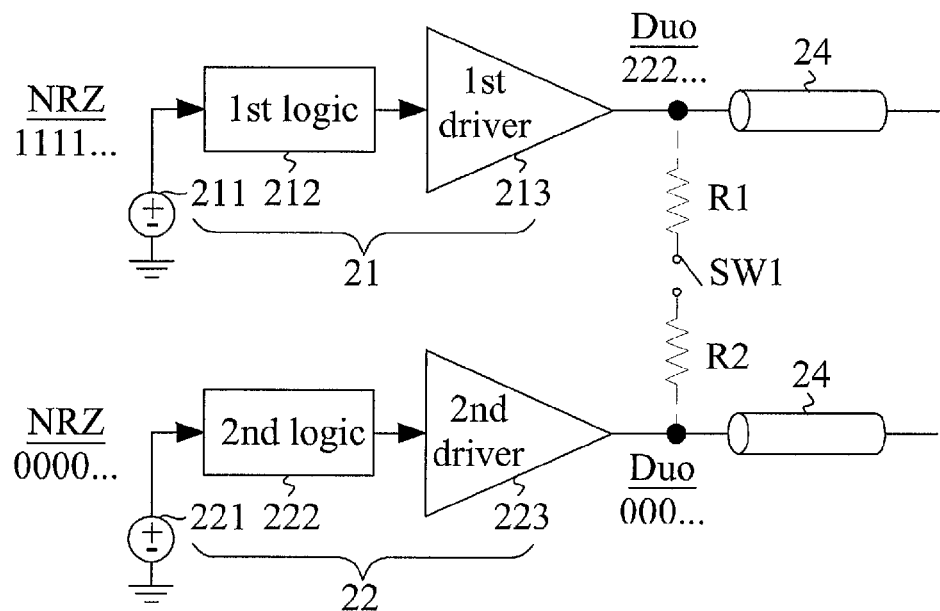
FIG. 4A and FIG. 4B exemplify the duobinary VM transmitter of FIG. 2.
Figure 4B:
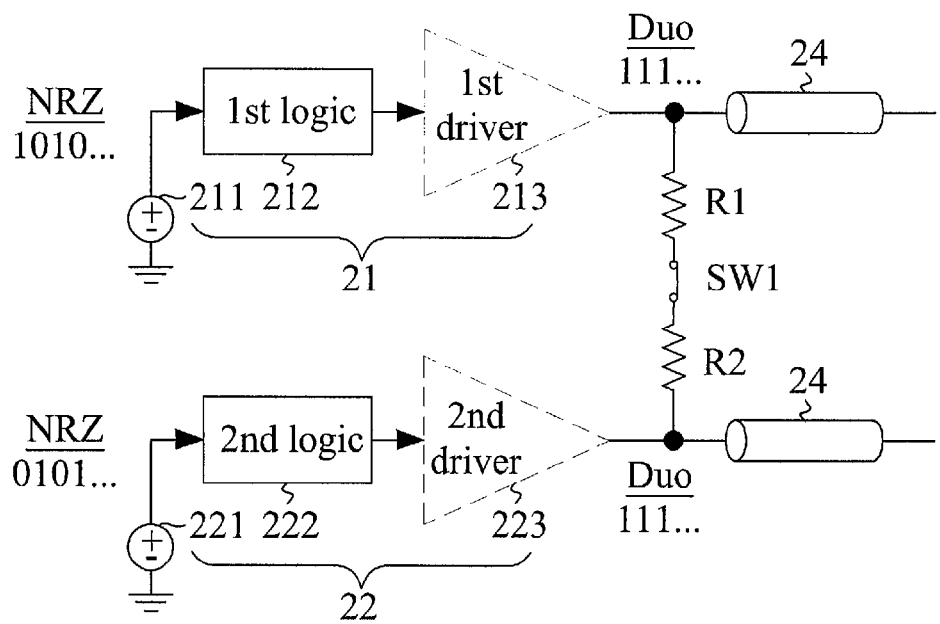

According to one aspect of the embodiment, when a transition occurs between the NRZ signals (i.e., between a present NRZ signal and a preceding NRZ signal) or, equivalently speaking, the duobinary signal has an intermediate level (i.e., "1") in a present period, the first switch SW1 is closed and the first and second drivers 213 and 223 may be turned off (as illustrated in periods 31, 32 and 33 in FIG. 3) to save power consumption. Otherwise, the first switch SW1 is open and the first and second drivers 213 and 223 may be turned on. FIG. 4A exemplifies the duobinary VM transmitter 200 of FIG. 2 when the first switch SW1 is open with the first and second drivers 213 and 223 being turned on, as no transition occurs in the present period. FIG. 4B exemplifies the duobinary VM transmitter 200 of FIG. 2 when the first switch SW1 is closed with the first and second drivers 213 and 223 being turned off denoted by dotted lines, as a transition occurs in the present period.

Figure 5A:
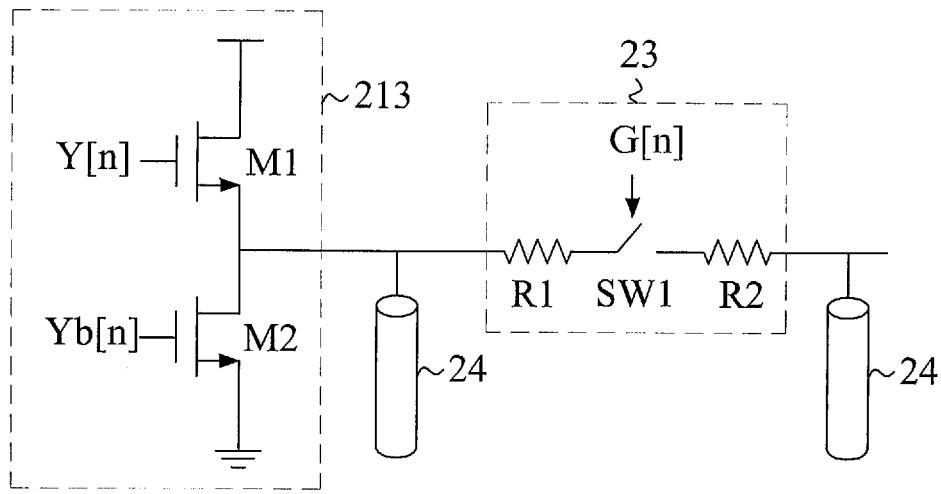
FIG. 5A shows a circuit diagram illustrating a portion of the transmitter of FIG. 2.
Figure 5B:
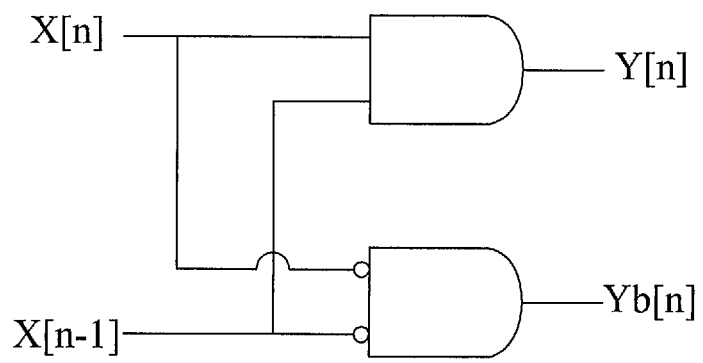
FIG. 5B shows a circuit diagram of the first logic circuit of FIG. 2.
Figure 5B:
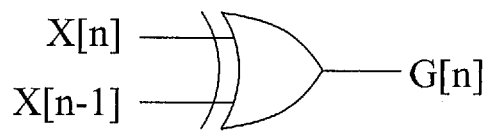

FIG. 5A shows a circuit diagram illustrating a portion of the transmitter 200 of FIG. 2, and FIG. 5B shows a circuit diagram of the first logic circuit 212 of FIG. 2. In the embodiment, the first driver 213 includes a first transistor M1 (e.g., an N-type transistor) and a second transistor M2 (e.g., an N-type transistor) connected in series between a power supply and ground. A source of the first transistor M1 is electrically coupled with a drain of the second transistor M2. The first logic circuit 212 (FIG. 5B) receives a present NRZ signal X[n] and a preceding NRZ signal X[n−1], and accordingly generates a first output signal Y[n] and a second output signal Yb[n] for controlling gates of the first and second transistors M1 and M2, respectively. The first logic circuit 212 also generates a third output signal G[n] for controlling the first switch SW1 according to the present NRZ signal X[n] and the preceding NRZ signal X[n−1].

Figure 6:
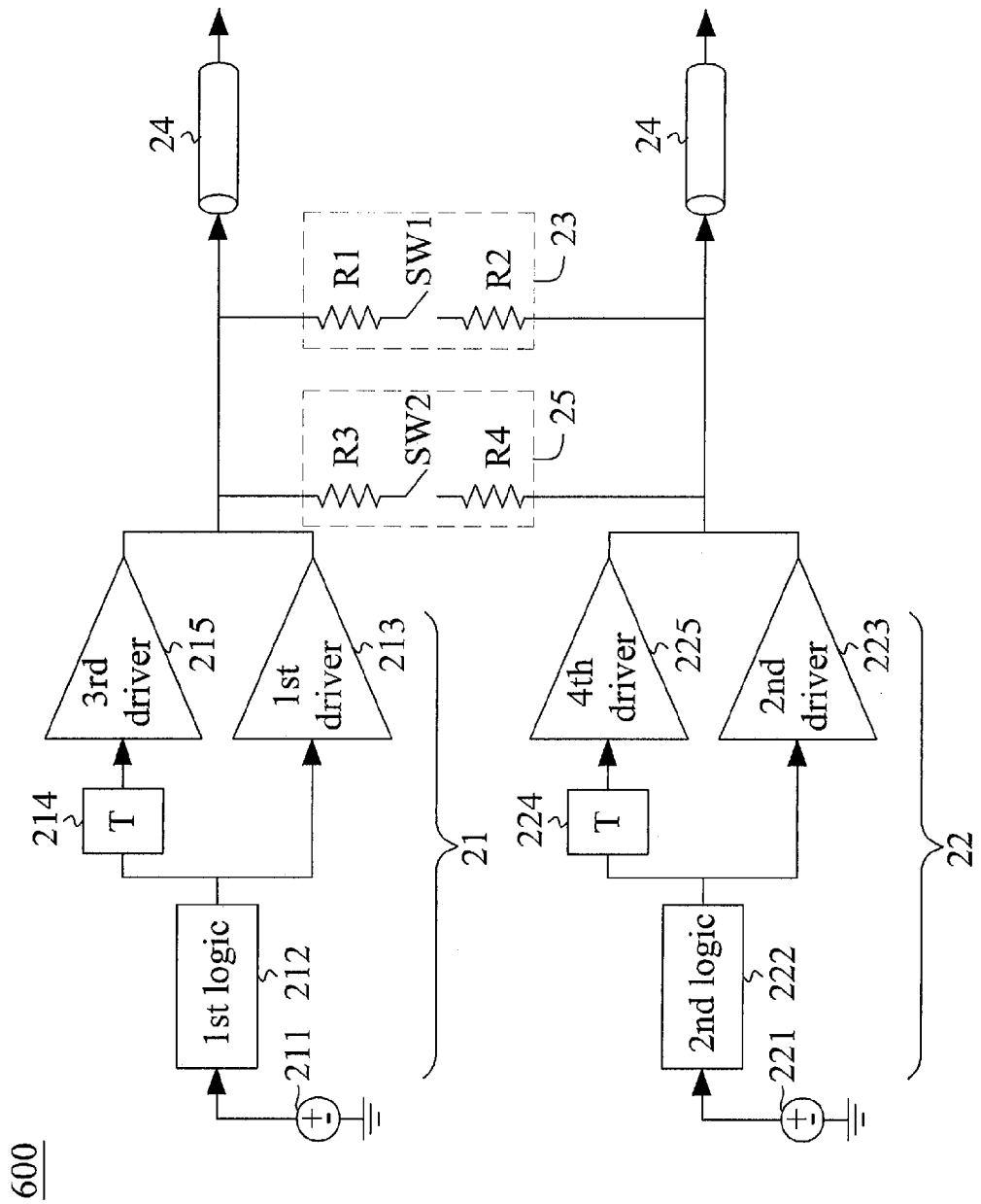
FIG. 6 shows a block diagram illustrated of a duobinary voltage-mode (VM) transmitter with pre-emphasis according to another embodiment of the present invention.

FIG. 6 shows a block diagram illustrated of a duobinary voltage-mode (VM) transmitter with equalization (transmitter hereinafter) 600 according to another embodiment of the present invention. The transmitter 600 (FIG. 6) is similar to the transmitter 200 (FIG. 2) in architecture, and the same composing elements are thus denoted by the same numerals or symbols. The transmitter 600, in addition, includes a first delay element 214 followed by a third driver (also called a post tag) 215 (connected in series to the first delay element 214) in the first branch 21. The first delay element 214 has a delay time of bit period. The third driver 215 is associated with the equalization (EQ), and may be called an EQ driver. The series-connected first delay element 214 and the third driver 215 collectively are connected with the first driver 213 in parallel. Although only a single EQ driver 215 is illustrated, it is noted that more than one EQ driver may be adopted, each being associated with different delay element with different delay time.

Similarly, the transmitter 600 further includes a second delay element 224 followed by a fourth driver (also called a post tag) 225 (connected in series to the first delay element 214) in the second branch 22. The second delay element 224 has a delay time of bit period. The fourth driver 225 is associated with the equalization (EQ), and may be called an EQ driver. The series-connected second delay element 224 and the fourth driver 225 collectively are connected with the second driver 223 in parallel. Although only a single EQ driver 225 is illustrated, it is noted that more than one EQ driver may be adopted, each being associated with different delay element with different delay time.

The transmitter 600 further includes a second match circuit 25, which is similar to the first match circuit 23, having two ends electrically coupled between output nodes of the first and second drivers 213 and 223, respectively. The second match circuit 25 is associated with the equalization (EQ), may be schematically represented by a third match resistor R3, a fourth match resistor R4 and a second switch SW2 connected in series. Although only a single second match circuit 25 is illustrated, it is noted that more than one match circuit associated with the equalization (EQ) may be adopted. When the second switch SW2 is closed, the third resistor R3 and the fourth resistor R4 collectively have a resistance being substantially approximate to an impedance of a transmission channel 24 such that a proper impedance match may be achieved.

According to one aspect of the embodiment, the second match circuit 25 and the associated third and fourth drivers 215 and 225 operate in a manner similar to the first match circuit 23 and the associated first and second drivers 213 and 223, with the differences described below. When a transition occurs between two preceding NRZ signals or, equivalently speaking, the duobinary signal has an intermediate level (i.e., "1") in a preceding period, the second switch SW2 is closed and the third and fourth drivers 215 and 225 may be turned off to save power consumption. Otherwise, the second switch SW2 is open and the third and fourth drivers 215 and 225 may be turned on.

Figure 7A:
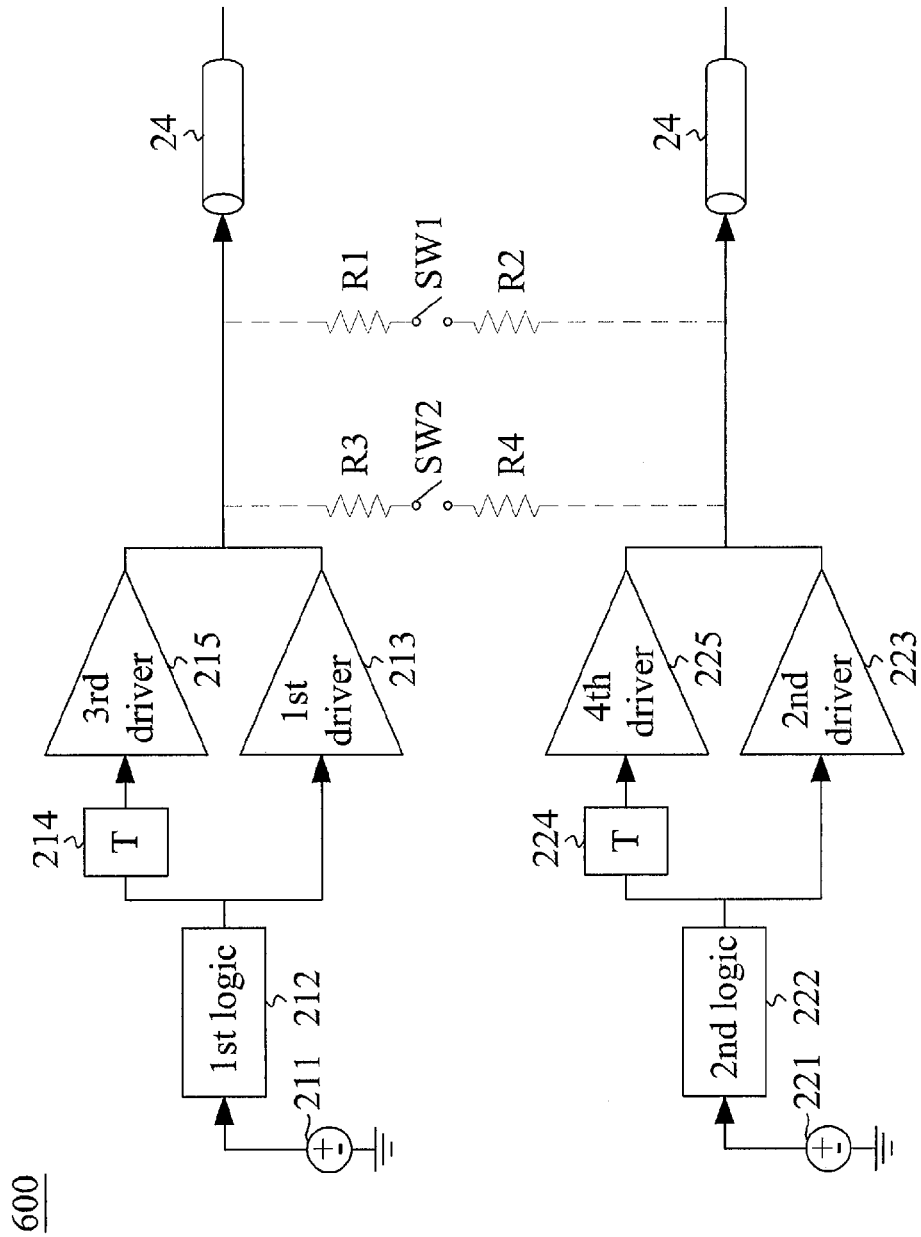
FIG. 7A through FIG. 7D exemplify the duobinary VM transmitter of FIG. 6.
Figure 7B:
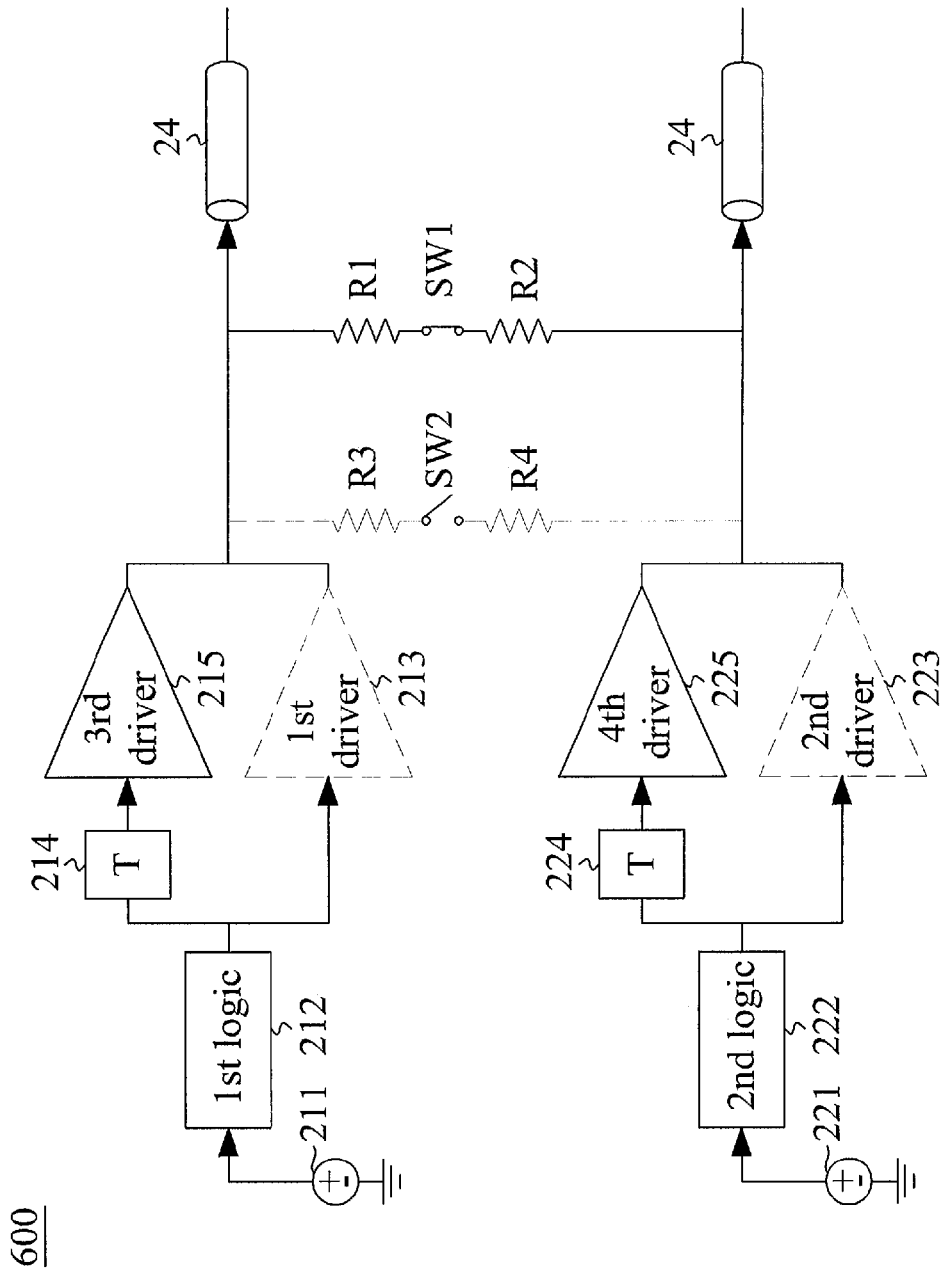
Figure 7C:
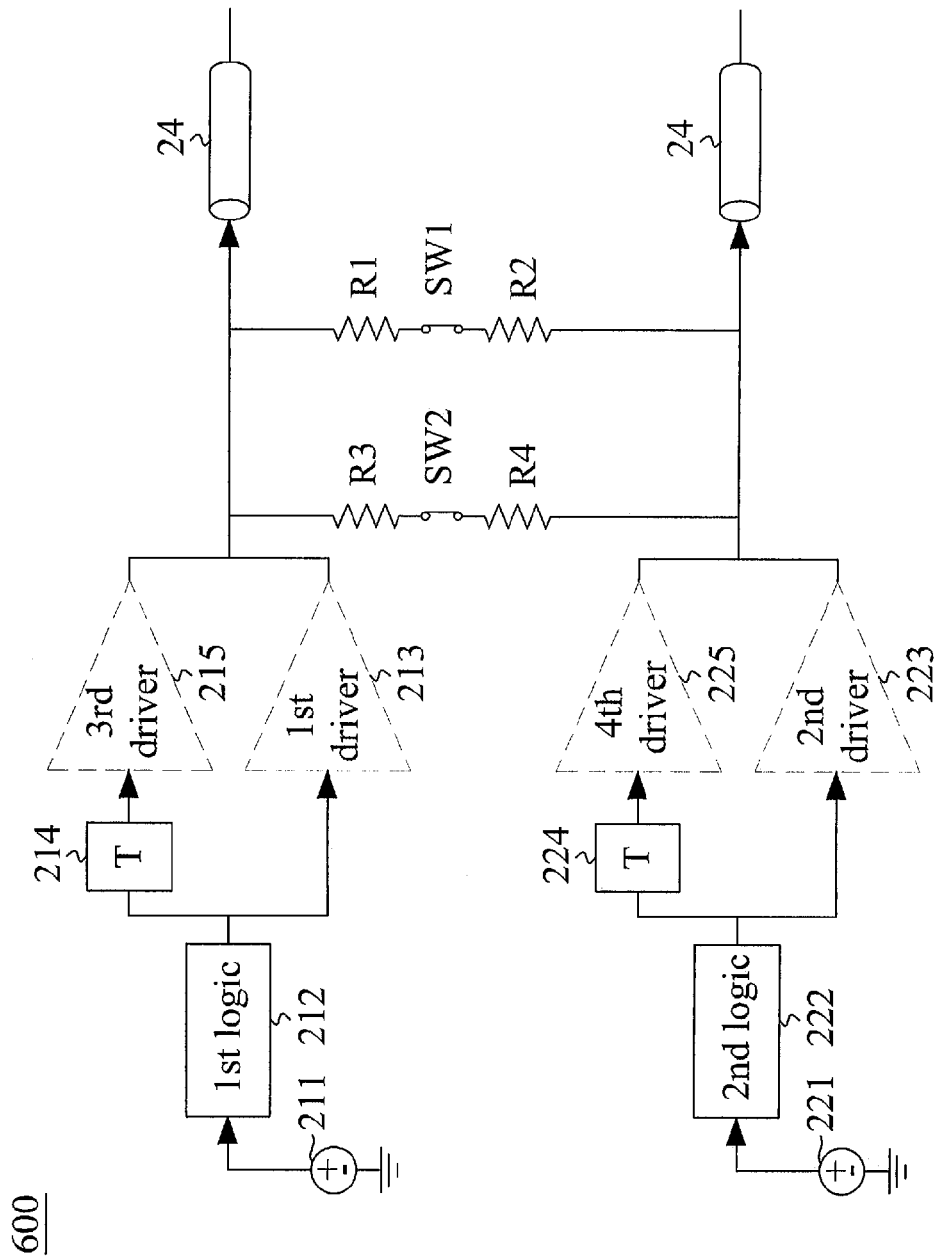
Figure 7D:
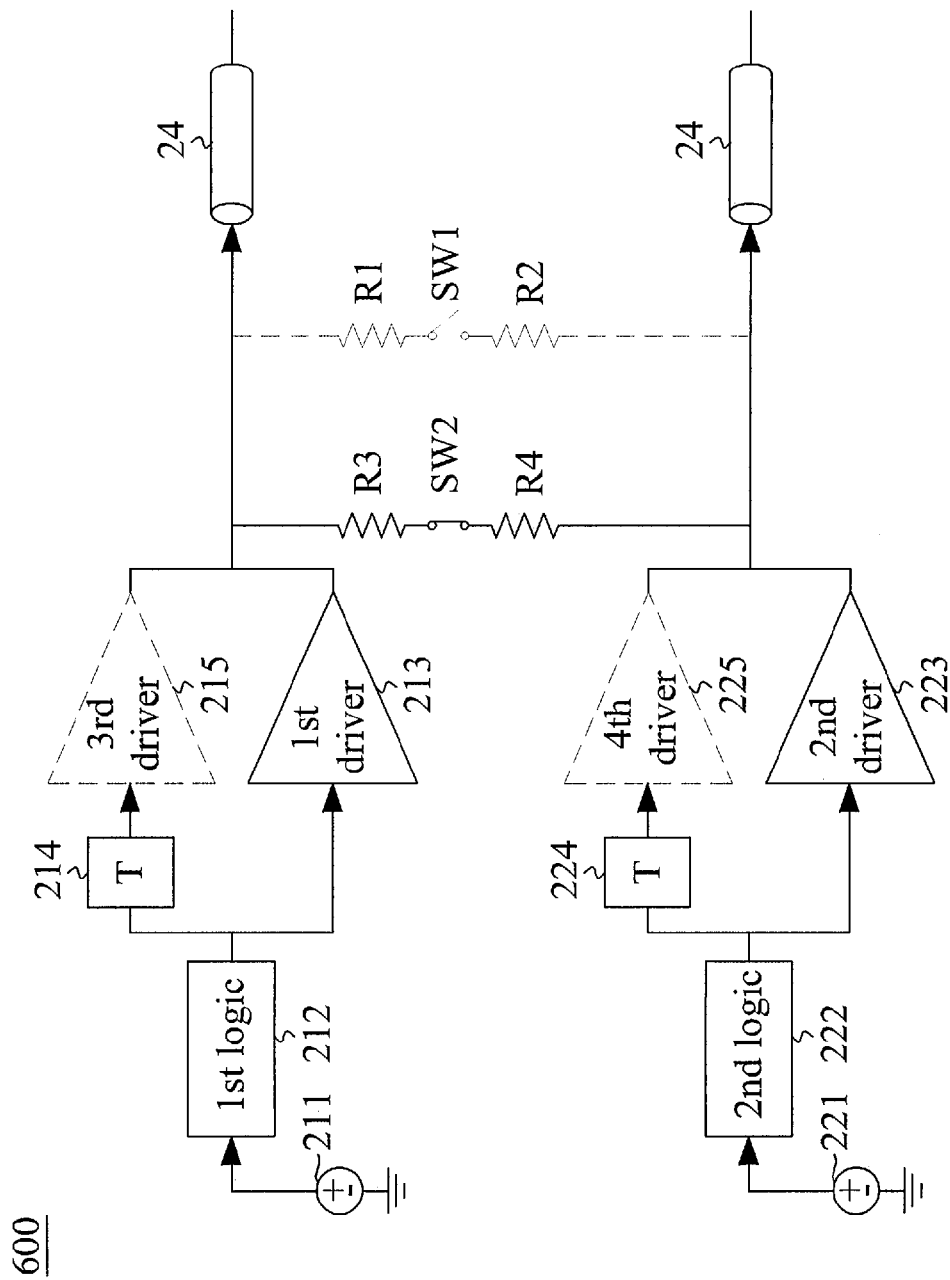

FIG. 7A exemplifies the duobinary VM transmitter 600 of FIG. 6 when the first and second switches SW1 and SW2 are open with the first through fourth drivers 213, 215, 223 and 225 being turned on, as no transition occurs between the NRZ signals in the present and delayed periods. FIG. 7B exemplifies the duobinary VM transmitter 600 of FIG. 6 when the first switch SW1 is closed with the first and second driver 213 and 223 being turned off, as a transition occurs between the NRZ signals in the present period; the second switch SW2 is open with the third and fourth driver 215 and 225 being turned on, as no transition occurs between the NRZ signals in the delayed period. FIG. 7C exemplifies the duobinary VM transmitter 600 of FIG. 6 when the first and second switches SW1 and SW2 are closed with the first through fourth drivers 213, 215, 223 and 225 being turned off, as a transition occurs between the NRZ signals in the present and delayed periods. FIG. 7D exemplifies the duobinary VM transmitter 600 of FIG. 6 when the first switch SW1 is open with the first and second driver 213 and 223 being turned on, as no transition occurs between the NRZ signals in the present period; the second switch SW2 is closed with the third and fourth driver 215 and 225 being turned off, as a transition occurs between the NRZ signals in the delayed period.

Figure 8A:
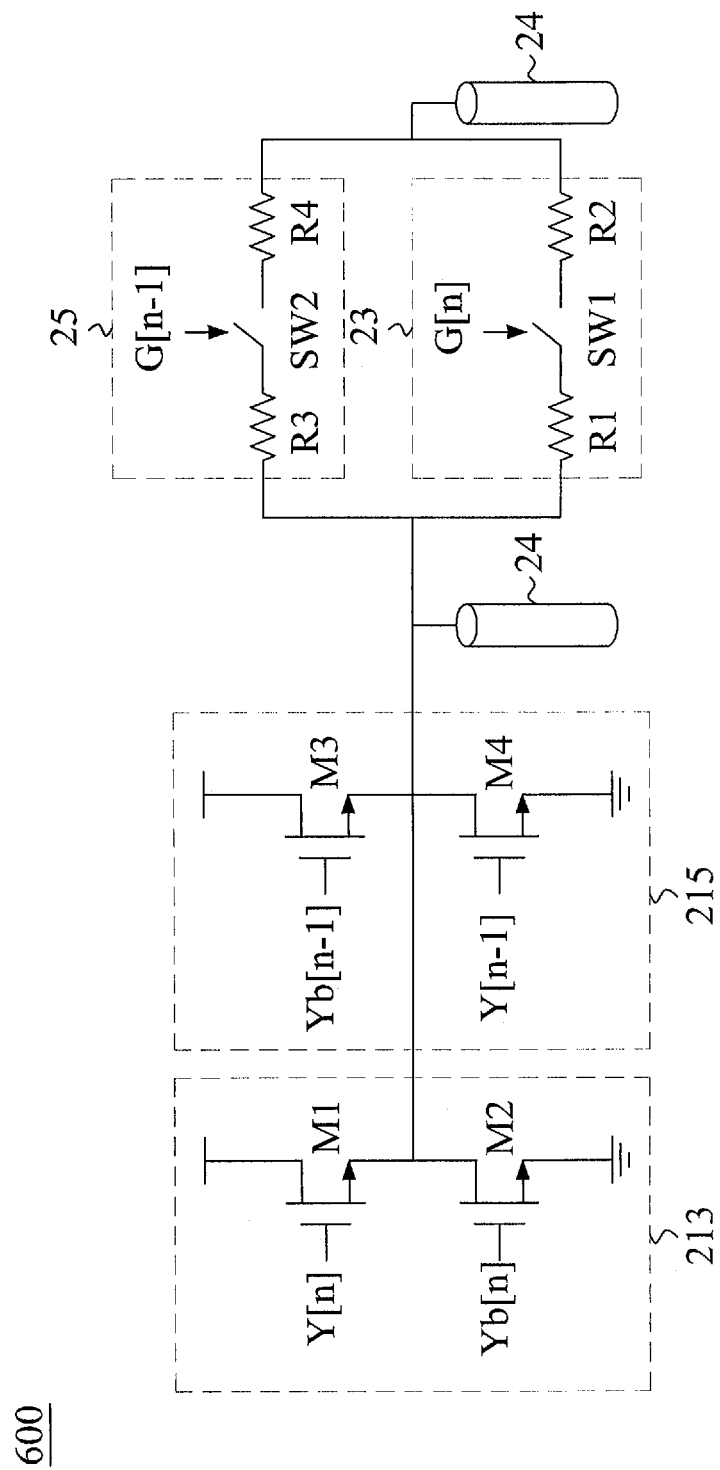
FIG. 8A shows a circuit diagram illustrating a portion of the transmitter of FIG. 6.
Figure 8B:
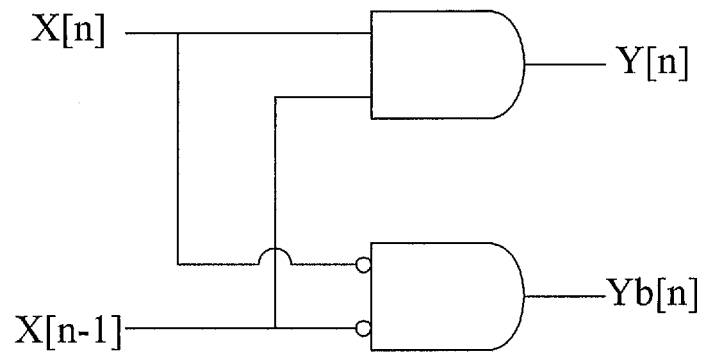
FIG. 8B shows a circuit diagram of the first logic circuit of FIG. 6.
Figure 8B:
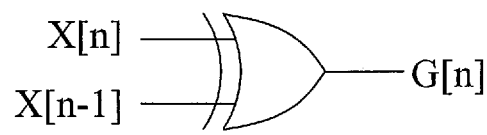
Figure 8B:
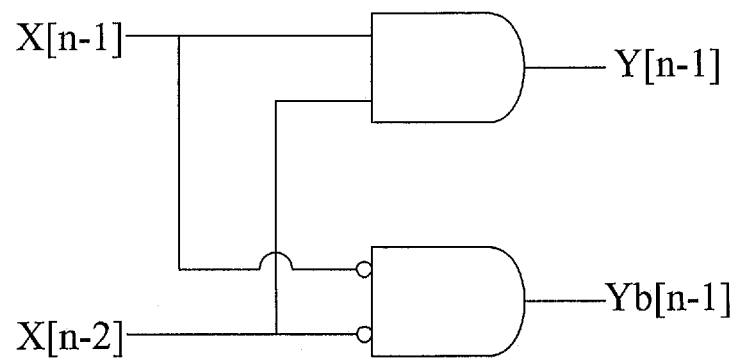
Figure 8B:
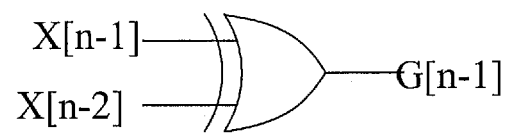

FIG. 8A shows a circuit diagram illustrating a portion of the transmitter 600 of FIG. 6, and FIG. 8B shows a circuit diagram of the first logic circuit 212 of FIG. 6. In the embodiment, the first driver 213 has a circuitry being the same as in FIG. 5A. The third driver 215 of the embodiment includes a third transistor M3 (e.g., an N-type transistor) and a fourth transistor M4 (e.g., an N-type transistor) connected in series between a power supply and ground. A source of the third transistor M3 is electrically coupled with a drain of the fourth transistor M4. The first logic circuit 212 (FIG. 8B) receives a present NRZ signal X[n] and a preceding NRZ signal X[n−1], and accordingly generates a first output signal Y[n] and a second output signal Yb[n] for controlling gates of the first and second transistors M1 and M2, respectively. Moreover, the first logic circuit 212 (FIG. 8B) receives a preceding NRZ signal X[n−1] and a NRZ signal with two delay times X[n−2], and accordingly generates a fourth output signal Y[n−1] and a fifth output signal Yb[n−1] for controlling gates of the third and fourth transistors M3 and M4, respectively. The first logic circuit 212 also generates sixth output signal G[n−1] for controlling the second switch SW2 according to the preceding NRZ signal X[n−1] and the NRZ signal with two delay times X[n−2].

Although specific embodiments have been illustrated and described, it will be appreciated by those skilled in the art that various modifications may be made without departing from the scope of the present invention, which is intended to be limited solely by the appended claims.

What is claimed is:

1. A duobinary voltage-mode transmitter, comprising:
   a first branch including:
      a first logic circuit coupled to receive non-return-to-zero (NRZ) signals, and configured to detect transition between the NRZ signals;
      a first driver controlled by at least one output of the first logic circuit, thereby generating a duobinary signal;
   a second branch including:
      a second logic circuit coupled to receive complementary NRZ signals being complement to the NRZ signals received by the first logic circuit, and configured to detect transition between the complementary NRZ signals;
      a second driver controlled by at least one output of the second logic circuit;
   a first match circuit having two ends coupled between output nodes of the first driver and the second driver, respectively, the first match circuit being switchable by an output of the first or second logic circuit;
   when a transition occurs between the NRZ signals, the first match circuit is switched on such that the two ends of the first match circuit are electrically coupled between the output nodes of the first driver and the second driver, respectively, and the first driver and the second driver are turned off.

2. The transmitter of claim 1, wherein the NRZ signals received by the first logic circuit or the second logic circuit comprise a present NRZ signal and at least one preceding NRZ signal.

3. The transmitter of claim 1, wherein the duobinary signal has three possible levels—"0", "1" and "2", where "2" is represented by a positive voltage, "0" is represented by a negative voltage or ground, and "1" is represented by an in-between voltage.

4. The transmitter of claim 3, wherein the first driver and the second driver generate a duobinary signal "1" when a transition occurs between the NRZ signals; otherwise, the first driver and the second driver generate a duobinary signal "2" when a present NRZ signal is "1", or generate a duobinary signal "0" when a present NRZ signal is "0".

5. The transmitter of claim 1, wherein the first match circuit comprises a first match resistor, a second match resistor and a first switch connected in series.

6. The transmitter of claim 5, when the first switch is closed, the first resistor and the second resistor collectively have a resistance being substantially matched to an impedance of a transmission channel.

7. The transmitter of claim 5, wherein the first switch is closed when a transition occurs between the NRZ signals.

8. The transmitter of claim 5, wherein the first driver or the second driver comprises a first transistor and a second transistor connected in series between a power supply and ground.

9. The transmitter of claim 8, wherein a source of the first transistor is electrically coupled with a drain of the second transistor.

10. The transmitter of claim 9, wherein the first logic circuit receives a present NRZ signal and a preceding NRZ signal, and accordingly generates a first output signal and a second output signal for controlling gates of the first and second transistors, respectively; and the first logic circuit generates a third output signal for controlling the first switch according to the present NRZ signal and the preceding NRZ signal.

11. The transmitter of claim 1, further comprising:
   a first delay element;
   a third driver connected in series behind the first delay element, the series-connected first delay element and the third driver collectively being connected with the first driver in parallel;
   a second delay element;
   a fourth driver connected in series behind the second delay element, the series-connected second delay element and the fourth driver collectively being connected with the second driver in parallel; and
   a second match circuit being connected with the first match circuit in parallel;
   when a transition occurs between two preceding NRZ signals, the second match circuit being switched on such that two ends of the second match circuit are electrically coupled between the output nodes of the third driver and the fourth driver, respectively, and the third driver and the fourth driver are turned off.

12. The transmitter of claim 11, wherein the second match circuit comprises a third match resistor, a fourth match resistor and a second switch connected in series.

13. The transmitter of claim 12, when the second switch is closed, the third resistor and the fourth resistor collectively have a resistance being substantially matched to an impedance of a transmission channel.

14. The transmitter of claim 12, wherein the second switch is closed when a transition occurs between the two preceding NRZ signals.

15. The transmitter of claim 12, wherein the third driver or the fourth driver comprises a third transistor and a fourth transistor connected in series between a power supply and ground.

16. The transmitter of claim 15, wherein a source of the third transistor is electrically coupled with a drain of the fourth transistor.

17. The transmitter of claim 16, wherein the first logic circuit receives a preceding NRZ signal and a NRZ signal with two delay times, and accordingly generates a fourth output signal and a fifth output signal for controlling gates of the third and fourth transistors, respectively; and the first logic circuit generates a sixth output signal for controlling the second switch according to the preceding NRZ signal and the NRZ signal with two delay times.

\* \* \* \* \*